(12) United States Patent
Sadek

(10) Patent No.: US 7,281,311 B2
(45) Date of Patent: Oct. 16, 2007

(54) METHOD OF ATTACHING A TRANSFER RESISTANT RFID TAG TO A SURFACE

(75) Inventor: Hatem Sadek, Safat (KW)

(73) Assignee: Diyar United Company, Dajeen (KW)

( * ) Notice: Subject to any disclaimer, the term of this patent is extended or adjusted under 35 U.S.C. 154(b) by 416 days.

(21) Appl. No.: 11/051,657

(22) Filed: Feb. 4, 2005

(65) Prior Publication Data

US 2006/0174470 A1   Aug. 10, 2006

(51) Int. Cl.
*H04R 31/00* (2006.01)

(52) U.S. Cl. ............... 29/594; 29/25.35; 29/592.1; 29/609.1; 181/171; 181/172; 235/454; 235/455; 235/492; 310/313 B; 310/313 R

(58) Field of Classification Search ............ 29/25.35, 29/592.1, 594, 609.1; 310/313 B, 313 R; 181/171, 172; 235/454, 455, 492
See application file for complete search history.

(56) References Cited

U.S. PATENT DOCUMENTS 6,107,920 A * 8/2000 Eberhardt et al. ....... 340/572.7
6,622,567 B1 * 9/2003 Hamel et al. ............ 73/786
7,034,660 B2 * 4/2006 Watters et al. .......... 340/10.41
7,161,484 B2 * 1/2007 Tsoukalis ............... 340/539.12

* cited by examiner

Primary Examiner—Paul D. Kim
(74) Attorney, Agent, or Firm—Donald J. Ersler

(57) ABSTRACT

A transfer resistant RFID tag preferably includes an identification chip, a tag coil, a housing and a cap. The identification chip is electrically connected to the tag coil with two wires. A first quantity of bonding compound is applied to a surface that is slightly greater than a surface area of the identification chip. A second quantity of bonding compound is applied to the surface that is slightly greater than the end surface area of the housing. One end of the housing is attached to the second quantity of bonding compound. Then the identification chip is attached to the first quantity of bonding compound. The cap is snapped over the tag coil and the other end of the housing. If someone tries to transfer the RFID tag from one surface to another, the two wires or the identification chip will be destroyed during removal.

17 Claims, 2 Drawing Sheets

METHOD OF ATTACHING A TRANSFER RESISTANT RFID TAG TO A SURFACE

BACKGROUND OF THE INVENTION

1. Field of the Invention

The present invention relates generally to radio frequency identification (RFID) tags and more specifically to a transfer resistant RFID tag, which is destroyed by removal and subsequent transfer to a second surface.

2. Discussion of the Prior Art

It appears that the prior art does not disclose a RFID tag that is attached to a metal surface, such as a motor vehicle body. It is also desirable that once the RFID tag is attached to a first surface that it cannot be removed and transferred to a second surface. Removal of the RFID tag from the first surface must result in the destruction thereof to prevent transfer to the second surface.

Accordingly, there is a clearly felt need in the art for a transfer resistant RFID tag, which is attachable to a metal surface and is destroyed by removal to prevent transfer to a second surface.

SUMMARY OF THE INVENTION

The present invention provides a transfer resistant RFID tag, which may be attached to a metal surface. The transfer resistant RFID tag (RFID tag) preferably includes an identification chip, a tag coil, a housing and a cap. The identification chip is electrically connected to the tag coil with two wires. A length of the of each wire is greater than a height of the housing. The housing is preferably a round tube. A first quantity of bonding compound is applied to a surface that is slightly greater than a surface area of the identification chip. A second quantity of bonding compound is applied to the surface that is slightly greater than the end surface area of the housing. One end of the housing is attached to the second quantity of bonding compound. Then the identification chip is attached to the first quantity of bonding compound. The cap is snapped over the tag coil and the other end of the housing. If someone tries to transfer the RFID tag from one surface to another, the two wires or the identification chip will be destroyed during removal.

Accordingly, it is an object of the present invention to provide a transfer resistant RFID tag, which is attachable to a metal surface.

Finally, it is another object of the present invention to provide a transfer resistant RFID tag, which is destroyed by removal thereof to prevent transfer to another surface.

These and additional objects, advantages, features and benefits of the present invention will become apparent from the following specification.

DETAILED DESCRIPTION OF THE PREFERRED EMBODIMENTS

Figure 1:
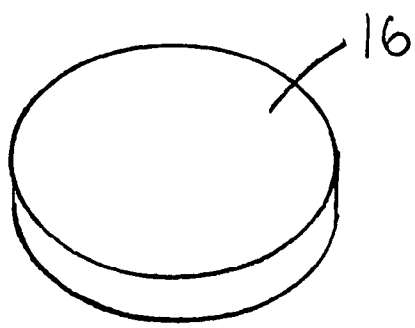
FIG. 1 is an exploded perspective view of an RFID tag in accordance with the present invention.
Figure 1:
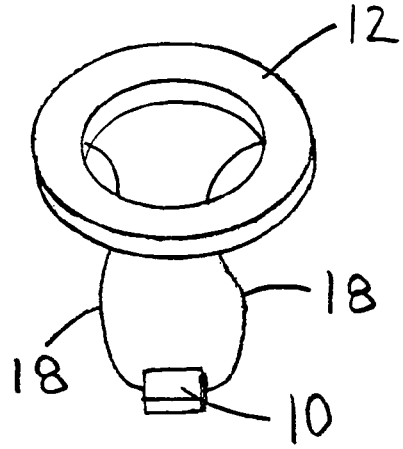
Figure 1:
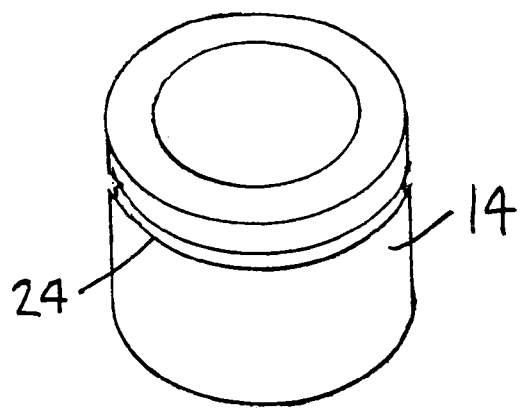

With reference now to the drawings, and particularly to FIG. 1, there is shown an exploded perspective view of an RFID tag 1. The RFID tag 1 preferably includes an identification chip 10, a tag coil 12, a housing 14 and a cap 16. The identification chip 10 is an integrated circuit that contains identification information. The tag coil 12 acts as an antenna to convert a magnetic field from an identification reader to electrical current to power the identification chip 10. The identification chip 10 transmits an identification address back to the identification reader. The operational details of identification chips and tag coils of inductively coupled RFID tags are well known in the art and need not be explained in further detail.

Figure 2:
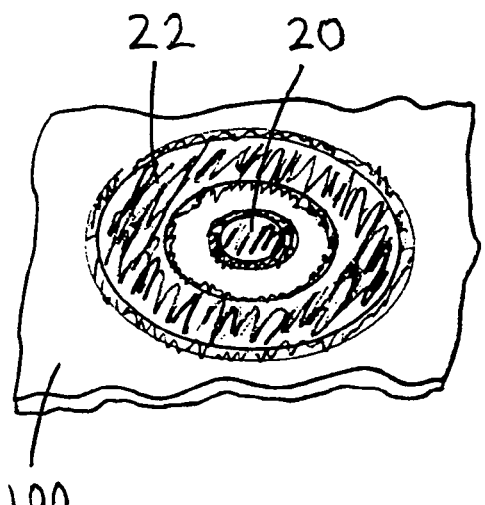
FIG. 2 is a perspective view of a surface with first and second quantities of bonding compound for attachment of an RFID tag in accordance with the present invention.
Figure 3:
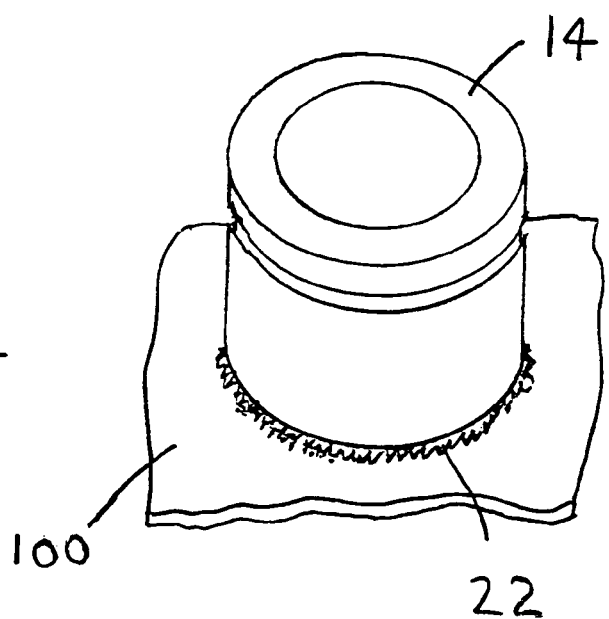
FIG. 3 is a perspective view of a housing of an RFID tag attached to a second quantity of bonding compound in accordance with the present invention.

The identification chip 10 is electrically connected to the tag coil 12 with two wires 18. A length of the two wires 18 is greater than a height of the housing 14. The housing 14 is preferably a round tube as shown in the figures, but other shapes or structures may also be used. With reference to FIGS. 2-3, a surface 100 is first cleaned. The surface 100 may be fabricated from a metal material or any other type material. A first quantity of bonding compound 20 is applied to the surface 100 that is slightly greater than a surface area of the identification chip 10. A second quantity of bonding compound 22 is applied to the surface that is slightly greater than the end surface area of the housing 14. The second quantity of bonding compound 22 is preferably concentric with the first quantity of bonding compound 20.

Figure 4:
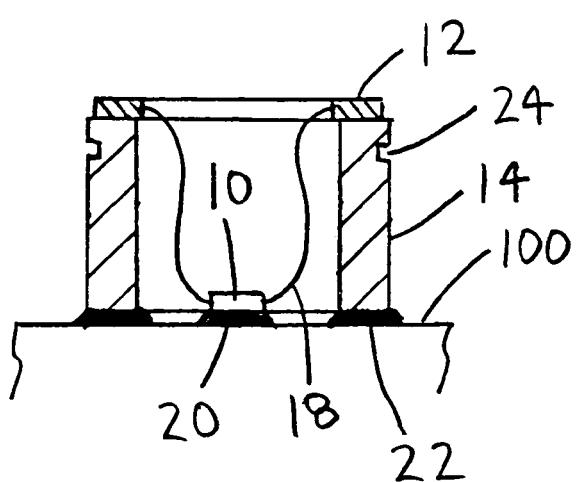
FIG. 4 is a cross sectional view of a housing and an identification chip retained on a surface in accordance with the present invention.
Figure 6:
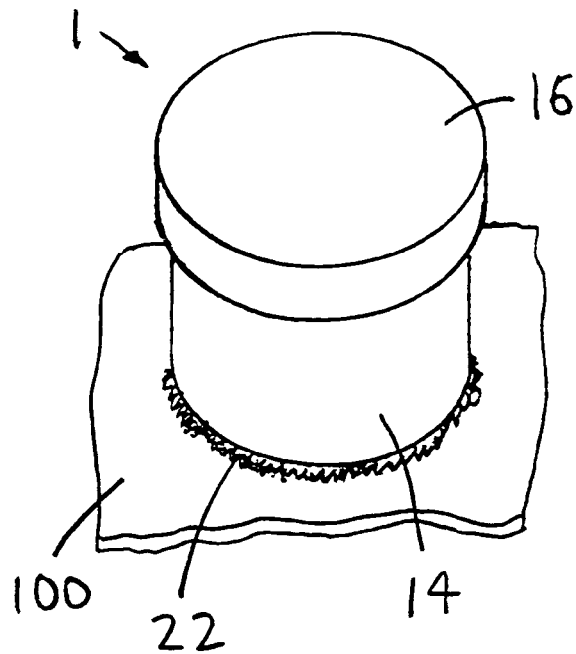
FIG. 6 is a perspective view of an RFID tag mounted to a surface in accordance with the present invention.
Figure 5:
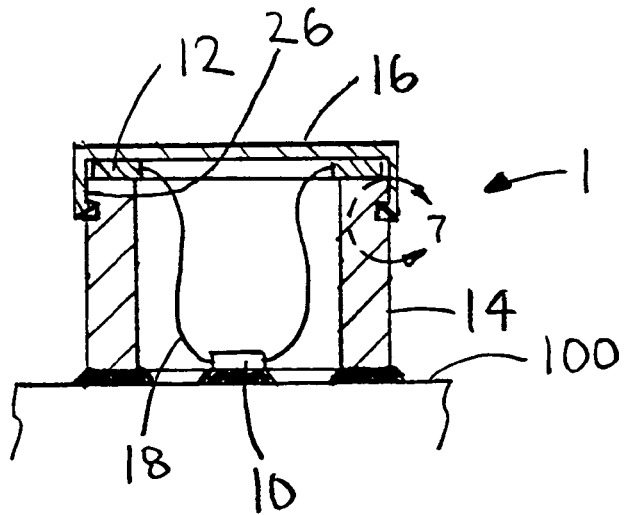
FIG. 5 is a cross sectional view of an RFID tag retained on a surface in accordance with the present invention.
Figure 7:
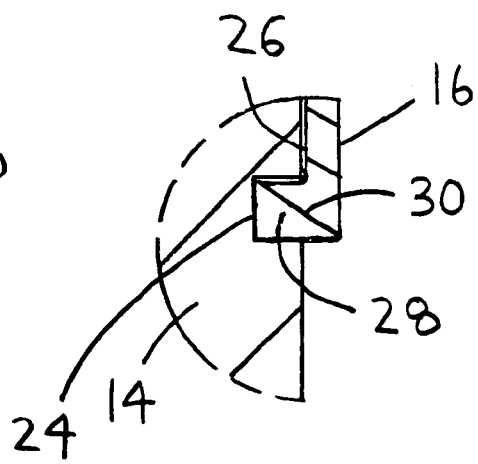
FIG. 7 is an enlarged cross sectional view of a snap lip retained in a snap slot of an RFID tag in accordance with the present invention.

With reference to FIGS. 4-6, one end of the housing 14 is attached to the second quantity of bonding compound 22. Then the identification chip 10 is attached to the first quantity of bonding compound 20. An outer perimeter of the tag coil 12 is aligned concentric with an outer perimeter of the housing 14. The housing 14 preferably includes a snap slot 24 that surrounds the outer perimeter thereof. With reference to FIG. 7, an inner perimeter 26 of the cap 16 is sized to slidably receive the outer perimeter of the housing 14. A snap lip 28 extends inward from the inner perimeter 26 of the cap 16. A chamfer 30 is preferably formed on the snap lip 28 to facilitate easy assembly to the housing 14. The snap slot 24 is sized to retain the snap lip 28, such that the cap 16 must be destroyed to remove thereof from the housing 14. However, other snapping designs or methods between the housing 14 and the cap 16 may also be used. The cap 16 and/or the tag coil 12 may also be bonded to the housing 14. The housing 14 and the cap 14 are preferably fabricated from a nonelectrically conductive material. The cap 16 also retains the tag coil 12 relative to the housing 14 without bonding. If someone tries to transfer the RFID tag 1 from one surface to another, the two wires 18 or the identification chip 10 will be destroyed during removal.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of attaching a transfer resistant RFID tag to a surface, comprising the steps of:
    connecting electrically an identification chip to a tag coil;
    bonding a housing to the surface by applying a first quantity of bonding compound that is slightly greater than the end surface area of said housing, said housing having an inner perimeter;
    bonding said identification chip to the surface by applying a second quantity of bonding compound that is slightly greater than a surface area of said identification chip within said inner perimeter; and
    securing a cap to a top of said housing.

2. The method of attaching a transfer resistant RFID tag to a surface of claim 1, further comprising the step of:
    fabricating the surface from a metal material.

3. The method of attaching a transfer resistant RFID tag to a surface of claim 1, further comprising the step of:
    connecting electrically said identification chip to said tag coil with two wires.

4. The method of attaching a transfer resistant RFID tag to a surface of claim 1, further comprising the step of:
    providing a housing that is a round tube.

5. The method of attaching a transfer resistant RFID tag to a surface of claim 1, further comprising the step of:
    extending inwardly a snap lip from an inside perimeter of said cap, forming a snap slot on an outside perimeter of said housing, said snap slot being sized to receive said snap lip.

6. The method of attaching a transfer resistant RFID tag to a surface of claim 1, further comprising the step of:
    retaining said tag coil on a top of said housing.

7. A method of attaching a transfer resistant RFID tag to a surface, comprising the steps of:
    connecting electrically an identification chip to a tag coil;
    bonding one end of a housing to the, surface by applying a first quantity of bonding compound that is slightly greater than the end surface area of said housing, said housing having an inner perimeter, retaining said tag coil on the other end of said housing;
    bonding said identification chip to the surface by applying a second quantity of bonding compound that is slightly greater than a surface area of said identification chip within said inner perimeter; and
    securing a cap to a top of said housing, said cap retaining said coil tag relative to said housing.

8. The method of attaching a transfer resistant RFID tag to a surface of claim 7, further comprising the step of:
    fabricating the surface from a metal material.

9. The method of attaching a transfer resistant RFID tag to a surface of claim 7, further comprising the step of:
    connecting electrically said identification chip to said tag coil with two wires.

10. The method of attaching a transfer resistant RFID tag to a surface of claim 7, further comprising the step of:
    providing a housing that is a round tube.

11. The method of attaching a transfer resistant RFID tag to a surface of claim 7, further comprising the step of:
    extending inwardly a snap lip from an inside perimeter of said cap, forming a snap slot on an outside perimeter of said housing, said snap slot being sized to receive said snap lip.

12. A method of attaching a transfer resistant RFID tag to a surface, comprising the steps of:
    connecting electrically an identification chip to a tag coil;
    bonding a housing to the surface, said housing having an inner perimeter, forming a snap slot on an outside perimeter of said housing;
    bonding said identification chip to the surface within said inner perimeter; and
    securing a cap to a top of said housing, said cap including a snap lip extending inwardly from an inside perimeter thereof, said snap slot being sized to receive said snap lip.

13. The method of attaching a transfer resistant RFID tag to a surface of claim 12, further comprising the step of:
    fabricating the surface from a metal material.

14. The method of attaching a transfer resistant RFID tag to a surface of claim 12, further comprising the step of:
    connecting electrically said identification chip to said tag coil with two wires.

15. The method of attaching a transfer resistant RFID tag to a surface of claim 12, further comprising the step of:
    applying a first quantity of bonding compound to the surface that is slightly greater than a surface area of said identification chip, applying a second quantity of bonding compound to the surface that is slightly greater than the end surface area of said housing.

16. The method of attaching a transfer resistant RFID tag to a surface of claim 12, further comprising the step of:
    providing a housing that is a round tube.

17. The method of attaching a transfer resistant RFID tag to a surface of claim 12, further comprising the step of:
    retaining said tag coil on a top of said housing.

* * * * *